United States Patent [19]

Yoshida

[11] Patent Number: 5,105,685
[45] Date of Patent: Apr. 21, 1992

[54] OIL-SEALING STRUCTURE OF MOTOR

[75] Inventor: Yasushi Yoshida, Kiryu, Japan

[73] Assignee: Mitsuba Electric Manufacturing Co., Ltd., Japan

[21] Appl. No.: 534,868

[22] Filed: Jun. 8, 1990

[51] Int. Cl.[5] .................. F16H 57/02; F02N 11/00
[52] U.S. Cl. ..................... 74/606 R; 74/6; 74/607
[58] Field of Search .............. 74/606 R, 607, 6, 7 E

[56]  References Cited
U.S. PATENT DOCUMENTS

| 4,726,254 | 2/1988 | Kubo et al. | 74/606 R |
| 4,763,538 | 8/1988 | Fujita et al. | 74/6 |
| 4,867,008 | 9/1989 | Yamaoka et al. | 74/606 R |
| 4,907,470 | 3/1990 | Kasemeier et al. | 74/606 R |
| 4,938,084 | 7/1990 | Morishita et al. | 74/6 |

Primary Examiner—Vinh T. Luong
Attorney, Agent, or Firm—Oliff & Berridge

[57] ABSTRACT

An oil-sealing structure of a motor including a bearing supporting a motor shaft, and an oil seal provided in the space between the motor shaft and a bracket and positioned close to one end of the motor shaft while separated by a predetermined distance from the bearing. An outer peripheral surface of the motor shaft faces, within the space, an inner peripheral surface of the bracket. Steps are formed on the motor-shaft outer peripheral surface and positioned between the bearing and the oil seal, with their diameter increasing in a stepped manner toward the bearing. A stepped groove is formed on the bracket inner peripheral surface and positioned between the bearing and the oil seal, with its diameter decreasing in a stepped manner toward the bearing. An oil outlet is also formed on the bracket inner peripheral surface for discharging oil which has penetrated beyond the oil seal. The structure is capable of highly secure prevention of oil penetration into the motor.

20 Claims, 2 Drawing Sheets

OIL-SEALING STRUCTURE OF MOTOR

BACKGROUND OF THE INVENTION

1. Field of the Invention

The present invention relates to an oil-sealing structure of a motor for, e.g., electrical equipment of a vehicle.

2. Description of the Prior Art

A motor of the above-mentioned type is generally such that the motor shaft is dipped in pump oil, as in the case of a motor connected with a pump for actuating an anti-lock brake (ALB) system. The inside of such a motor must be protected from penetration of oil. For this purpose, as shown in FIG. 3, a double oil-sealing structure is adapted, in which, in addition to an oil seal, an oil stopper is provided. However, this structure is still insufficient because is fails to block a small amount of oil which inevitably penetrates into the motor by flowing along the motor shaft.

SUMMARY OF THE INVENTION

In view of the above-described circumstances, the present invention has been accomplished in order to provide an oil sealing structure of a motor which is capable of eliminating the above-described problem.

According to one aspect of the present invention, there is provided an oil-sealing structure of a motor having a motor shaft, a bracket, a bearing provided in the space between the motor shaft and the bracket to support the motor shaft, and an oil seal provided in the space and disposed at a position close to one end of the motor shaft and separated by a predetermined distance from the bearing. The oil-sealing structure comprises:

an outer peripheral surface of the motor shaft and an inner peripheral surface of the bracket which face each other within the space; first steps formed on the outer peripheral surface of the motor shaft at a position between the bearing and the oil seal, the diameter of the steps increasing in a stepped manner toward the bearing; second steps formed in the inner peripheral surface of the bracket and at a position between the bearing and the oil seal, the diameter of the second steps decreasing in a stepped manner toward the bearing; and an oil outlet channel formed on the inner peripheral surface of the bracket for discharging oil which has penetrated beyond the oil seal.

According to the present invention, the above-specified structure is capable of highly secure prevention of oil penetration to the inside of the motor.

DESCRIPTION OF THE PREFERRED EMBODIMENT

One embodiment of the present invention will now be described with reference to the drawings.

Figure 1:
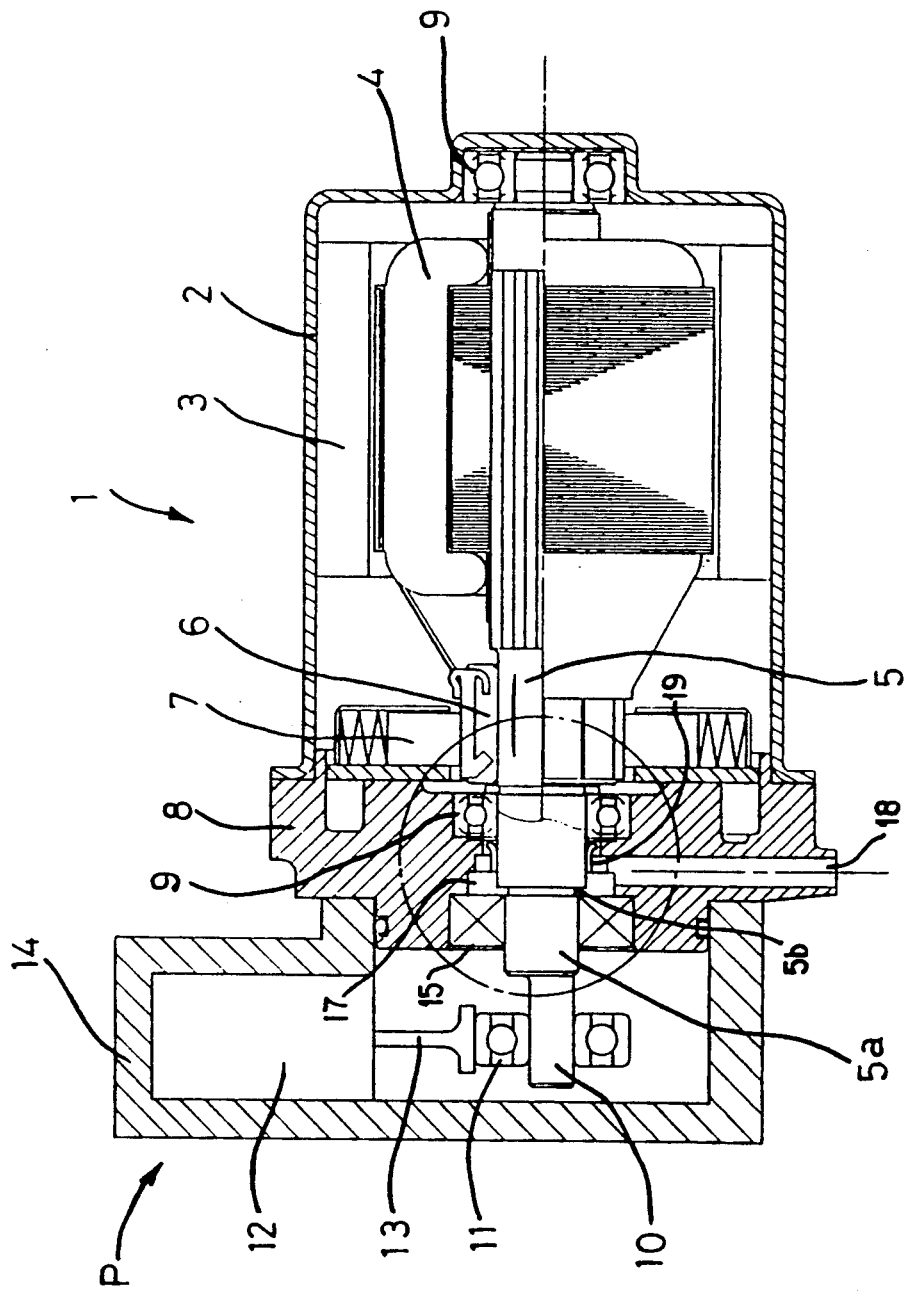
FIG. 1 is a sectional side view of a motor, showing one embodiment of an oil-sealing structure according to the present invention.

Referring to FIG. 1, reference numeral 1 denotes a motor for driving a pump which actuates an ALB system. The motor 1 includes, as has been conventionally known, a motor yoke 2, a permanent magnet 3, a rotor 4, a motor shaft 5, a commutator 6, and a brush 7.

The motor shaft 5 is rotatably supported by bearings 9 which are mounted on the motor yoke 2 and an end bracket 8 integrally assembled onto the yoke 2. One end 5a of the motor shaft 5 projects through the end bracket 8, and a crank shaft 10 is eccentrically connected to this end 5a. The crank shaft 10 is also connected, through a bearing 11, to a connecting rod 13 of a piston 12. Members, such as these, which constitute a pump section P are accommodated in a pump yoke 14. The pump yoke 14 is assembled onto that side of the end bracket 8 which faces the pump section P. The interior of the pump yoke 14 is filled with brake oil.

Figure 2:
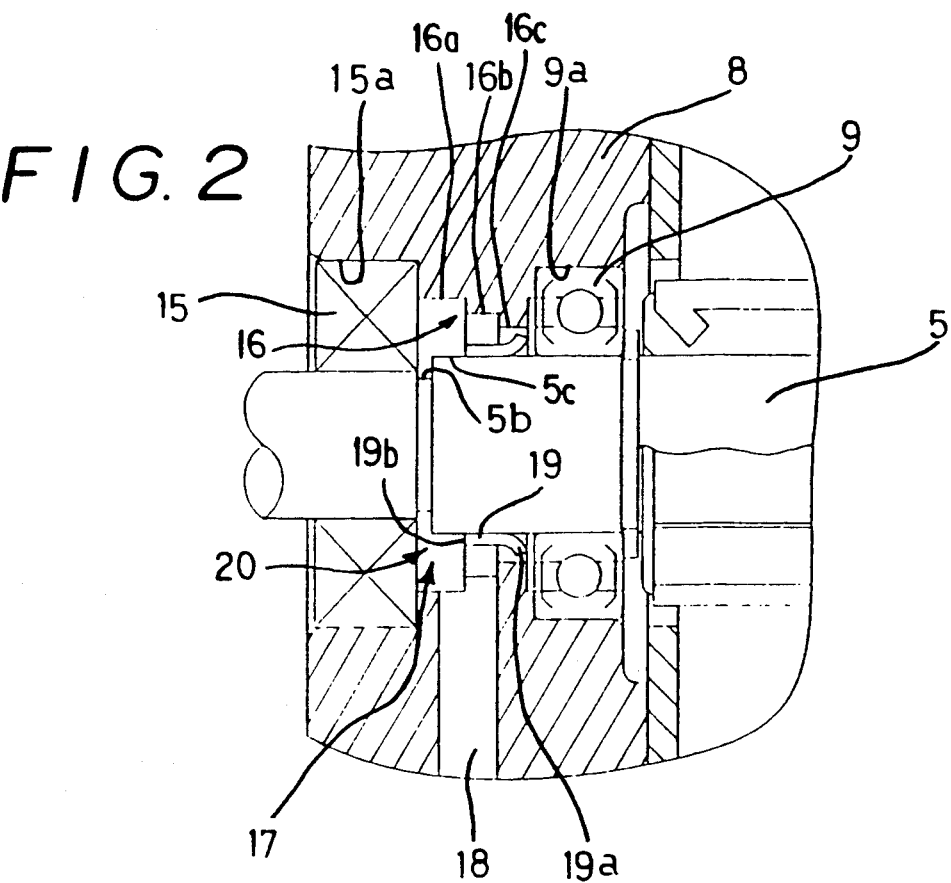
FIG. 2 is an enlarged sectional view of essential parts of the structure.
Figure 3:
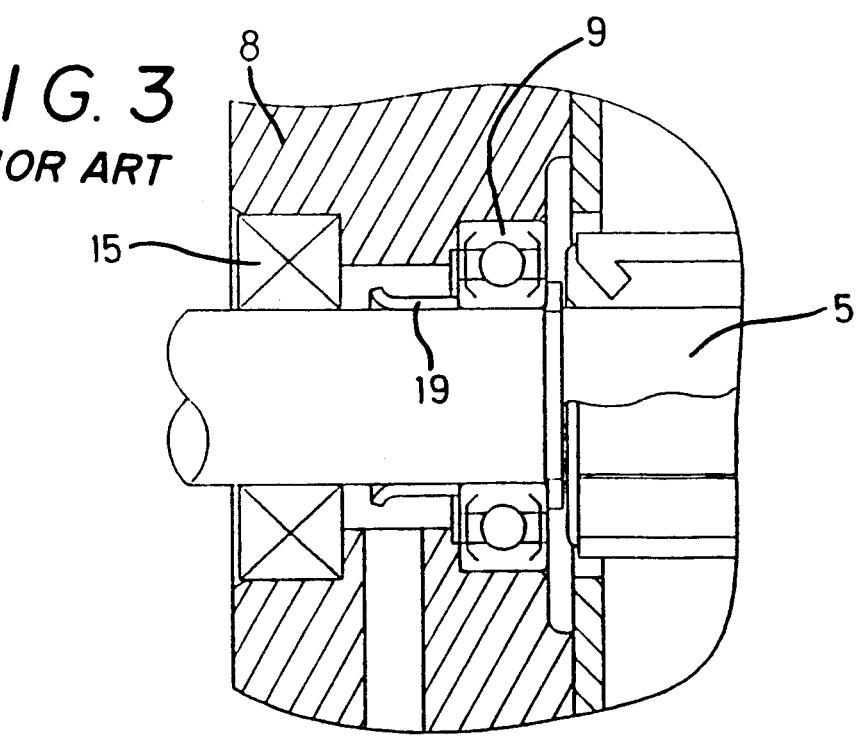
FIG. 3 is a view corresponding to FIG. 2, showing a conventional oil-sealing structure of a motor.

Referring to FIG. 2, an inner peripheral surface of the end bracket 8, across which the motor shaft 5 extends, is formed with a portion 9a receiving the bearing 9, as well as a portion 15a receiving an oil seal 15. The receiving portion 9a is on the side of the inner peripheral surface which is close to the motor 1, while the receiving portion 15a is separated from the portion 9a by a predetermined distance, and is on the side close to the pump section P. The oil seal 15, of which the inner periphery is in sliding contact with the motor shaft 5, is fitted in the receiving portion 15a. Between the bearing 9 and the oil seal 15, a part of the inner peripheral surface of the end bracket 8 faces an outer peripheral surface of the motor shaft 5. The end-bracket inner peripheral surface has second steps 16, specifically, first stepped portion 16a, second stepped portion 16b, and third stepped portion 16c, formed thereon, the diameter of the portions 16a, 16b and 16c decreasing in a stepped manner toward the bearing 9. The stepped portions 16 constitute a stepped annular groove 17 around the motor shaft 5. The end bracket 8 is also formed with an oil outlet channel 18 which extends downward, as viewed in FIG. 2, communicating the annular groove 17 with an oil tank, not shown, disposed outside the end bracket 8.

On the other hand, the outer peripheral surface of the motor shaft 5 which faces the above-described inner peripheral surface of the end bracket 8 has a recess 5b formed thereon positioned close to the oil seal 15. A cylindrical oil stopper 19 is fitted on the motor shaft 5 and positioned slightly distant from the recess 5b. The oil stopper 19 has a funnel-shaped peripheral edge 19a which is on the side close to the bearing 9, the edge 19a diverging toward the bearing 9. Thus, on the outer peripheral surface of the motor shaft 5, first steps 20 are defined by the recess 5b of shaft 5, the periphery of the intermediate portion 5c of shaft 5 and the periphery of oil stopper 19. Therefore, the rising inner wall of the recess 5b on the side close to the bearing 9, the end face 19b of the oil stopper 19 on the side close to the oil seal 15 which forms a step rising from the shaft 5, and the diverging peripheral edge 19a of the stopper 19 together form first steps 20 which make the outer peripheral surface of the motor shaft beyond the oil seal 15 increase in diameter toward the bearing 9.

In the embodiment of the present invention having the above-described construction, the inside of the pump yoke 14 and the inside of the motor 1 are sealed from each other by the oil seal 15 provided in the end bracket 8. However, a small amount of oil may enter the inside of the motor 1 by flowing along the motor shaft 5. In such cases, with the oil-sealing structure of the invention, the oil which has entered is prevented from reaching the bearing 9 by the recess 5b formed on the motor shaft 5 and the oil stopper 19 fitted thereon. The oil is further subjected to centrifugal force generated by the rotation of the motor shaft 5, whereupon the oil is splayed radially outward to be received in the stepped annular groove 17 formed in the end bracket 8. Thereafter, the oil within the groove 17 is returned therefrom to the oil tank through the outlet channel 18.

In this way, according to the present invention, when a part of the oil in the pump section P has entered beyond the oil seal 15, the oil-sealing structure provides the following function. The oil which has entered is blocked, first by the rising inner wall of the recess 5b on the side of the bearing 9, and then by the end face of the oil stopper 19 on the side of the oil seal 15. Even when a small portion of the oil flows inward over the oil stopper 19, the peripheral edge 19a located on the side of the bearing 9 prevents further inward advancement. In brief, an outer peripheral surface of the motor shaft 5 which is formed by the above-described members has its diameter increasing in a stepped manner toward the bearing 9, thereby effectively preventing inward penetration of oil. The oil thus prevented from penetration and maintained on the outer peripheral surface of the motor shaft 5 is splayed by centrifugal force caused by the rotation of the motor shaft 5 toward the annular groove 17 on the inner peripheral surface of the end bracket 8, to be received in the groove 17. Since the annular groove 17 is stepped and has its diameter decreasing in a stepped manner toward the bearing 9, the oil blown is positively received by the stepped surfaces of the first to third stepped portions 16 whose diameters decrease in a stepped manner. As a result, the amount of oil present on the inner peripheral surface of the end bracket 8 is decreased toward the bearing 9 until there is substantially no oil in the end. In brief, the inner peripheral surface of the end bracket 8 serves, in cooperation with the outer peripheral surface of the motor shaft 5, to enable highly secure prevention of oil penetration to the inside of the motor 1, thereby rendering the motor 1 free of oil adhered to the commutator 6, the brush 7, etc., hence, rendering it capable of exhibiting high reliability. The oil received in the annular groove 17 is discharged to the outside of the end bracket 8 by flowing through the channel 18. Accordingly, there is no risk that oil may remain in the end bracket 8. Another advantage is that it is possible to detect, from the amount of oil discharged, any damage or the degree of wear of the oil seal 15.

To summarize, the present invention has the following advantageous features.

Even when oil has entered beyond the oil seal, heading toward the bearing, the plurality of steps formed on the outer peripheral surface of the motor shaft, with diameters increasing in a stepped manner toward the bearing, serve to block the oil a number of times and securely.

When the oil is splayed toward the inner peripheral surface of the bracket by centrifugal force generated by the motor shaft rotation, the stepped annular groove having its diameter decreasing in a stepped manner toward the bearing causes the oil to be received by the plurality of stepped surfaces of the groove a number of the times, so that the oil amount decreases toward the bearing until there is substantially no oil in the end. Thus, highly secure prevention of oil penetration into the motor is possible, thereby rendering the inside of the motor free from oil adhesion to various members, hence, rendering the motor highly reliable.

The oil in the groove is discharged to the outside of the bracket through the oil outlet channel. This is advantageous in that oil is prevented from remaining in the bracket, and that any breakage or the degree of wear of the oil seal can be detected from the amount of discharged oil.

What is claimed is:

1. A combination of an oil-sealing structure of a motor having a motor shaft, a bracket, a bearing provided in the space between said motor shaft and said bracket to support said motor shaft, and an oil seal provided in said space and disposed at a position close to one end of said motor shaft and separated by a predetermined distance from said bearing, said combination comprising:

an outer peripheral surface of said motor shaft and an inner peripheral surface of said bracket which face each other within said space for said predetermined distance between said bearing and said oil seal;

first steps formed on said outer peripheral surface of said motor shaft at a position between said bearing and said oil seal, the diameter of said steps increasing in a stepped manner toward said bearing; and second steps formed on said inner peripheral surface of said bracket at a position between said bearing and said oil seal, the diameter of said second steps decreasing in a stepped manner toward said bearing to a diameter smaller than the diameter of said bearing.

2. An oil-sealing structure as claimed in claim 1, further comprising an oil outlet channel formed on said inner peripheral surface of said bracket for discharging oil which has penetrated beyond said oil seal.

3. An oil-sealing structure as claimed in claim 1, wherein said oil seal is in sliding contact with said shaft.

4. An oil-sealing structure as claimed in claim 1, wherein each of said first and second steps comprise at least two stepped surfaces.

5. An oil-sealing structure according to claim 1, further comprising:

an annular oil stopper disposed around said shaft, said stopper forming a step of increased diameter on said outer peripheral surface of said shaft.

6. A rotatable shaft and bearing assembly wherein the bearing is mounted in a retaining means and said shaft extends through said bearing and retaining means so as to be rotatably supported thereby, said assembly having an oil-sealing structure comprising:

an oil seal mounted in said retaining means spaced apart from said bearing along said shaft;

a stepped outer peripheral surface of said shaft positioned between said bearing and said oil seal, the diameter of said shaft increasing in a stepped manner toward said bearing; and a stepped inner peripheral surface of said retaining means having a plurality of steps positioned between said bearing and said oil seal and spaced outwardly from said outer peripheral surface, an inner diameter of said retaining means decreasing in a stepped manner toward said bearing to a diameter less than the diameter of said bearing.

7. An assembly as claimed in claim 6, wherein said oil seal is in sliding contact with said shaft.

8. An assembly as claimed in claim 6, further comprising an oil outlet channel formed on said inner peripheral surface of said retaining means for discharging oil which has penetrated said oil seal.

9. A rotatable shaft and bearing assembly wherein the bearing is mounted in a retaining means and said shaft extends through said bearing and retaining means so as to be rotatably supported thereby, said assembly having an oil-sealing structure comprising:

an oil seal mounted in said retaining means spaced apart from said bearing along said shaft; and a stepped inner peripheral surface of said retaining means having at least two steps positioned between said bearing and said oil seal and spaced outwardly from an outer peripheral surface of said shaft, an inner diameter of said retaining means decreasing in a stepped manner toward said bearing, whereby oil which has penetrated said oil seal and has been splayed outwardly from said shaft is prevented from reaching said bearing by being driven away from said bearing and up said stepped surface by centrifugal force.

10. An assembly as claimed in claim 9, further comprising an oil outlet channel formed on said inner peripheral surface of said retaining means for discharging said oil which has been splayed outwardly from said shaft.

11. An oil-sealing structure, comprising:
a rotatable shaft;
a bearing rotatably supporting said shaft;
an oil seal surrounding said shaft; and
a bracket supporting said bearing and said oil seal having
a bearing receiving portion, for receiving said bearing;
an oil seal receiving portion, for receiving said oil seal; and
an annular groove with first and second ends extending between said bearing receiving portion and said oil seal receiving portion, said first end being adjacent said oil seal receiving portion and said second end being adjacent said bearing receiving portion,
said first end of said annular groove having a smaller diameter than said oil seal receiving portion, said second end of said annular groove having a smaller diameter than said bearing receiving portion, and said second end having a smaller diameter than said first end,
wherein said shaft extends through said bearing and said oil seal.

12. An oil-sealing structure according to claim 11, wherein said annular groove has a plurality of stepped surfaces.

13. An oil-sealing structure according to claim 11, wherein said annular groove has three stepped surfaces.

14. An oil-sealing structure according to claim 11, wherein said shaft has an annular recess with a reduced diameter located between said oil seal and said bearing.

15. An oil-sealing structure according to claim 14, wherein said annular recess is located adjacent said oil seal.

16. An oil-sealing structure according to claim 11, further comprising:
an annular oil stopper having first and second ends disposed around said shaft between said oil seal and said bearing.

17. An oil-sealing structure according to claim 16, wherein said first end of said oil stopper provides a stepped surface and said oil stopper provides an increased diameter for said shaft adjacent said bearing.

18. An oil-sealing structure according to claim 16, wherein said second end of said oil stopper is flared toward said second end of said annular groove.

19. An oil-sealing structure according to claim 11, wherein said shaft is slidably coupled to said oil seal.

20. An oil-sealing structure according to claim 11, further comprising an oil outlet channel formed adjacent said first end of said annular groove for discharging oil.

* * * * *